US008707799B2

(12) United States Patent
Wiley et al.

(10) Patent No.: US 8,707,799 B2
(45) Date of Patent: Apr. 29, 2014

(54) METHOD FOR CHEMICAL MILLING AN APPARATUS WITH A FLOW PASSAGE

(75) Inventors: David R. Wiley, Jupiter, FL (US); Reed A. Kakuska, Juno, FL (US)

(73) Assignee: United Technologies Corporation, Hartford, CT (US)

( * ) Notice: Subject to any disclaimer, the term of this patent is extended or adjusted under 35 U.S.C. 154(b) by 377 days.

(21) Appl. No.: 13/250,230

(22) Filed: Sep. 30, 2011

(65) Prior Publication Data

US 2013/0085592 A1 Apr. 4, 2013

(51) Int. Cl.
*G06F 19/00* (2011.01)

(52) U.S. Cl.
USPC .............. 73/861; 415/146; 700/105; 700/109

(58) Field of Classification Search
USPC ...................... 700/105, 109; 415/146; 73/861
See application file for complete search history.

(56) References Cited

U.S. PATENT DOCUMENTS

| | | | | |
|---|---|---|---|---|
| 3,108,435 | A * | 10/1963 | Chandler et al. | 60/791 |
| 4,900,398 | A | 2/1990 | Chen | |
| 5,186,790 | A | 2/1993 | Powers | |
| 5,217,569 | A | 6/1993 | Hodgens et al. | |
| 5,408,747 | A * | 4/1995 | Fredmonski et al. | 29/889 |
| 5,441,574 | A | 8/1995 | Hansen et al. | |
| 6,148,677 | A * | 11/2000 | Evangelista | 73/861.02 |
| 6,203,716 | B1 | 3/2001 | Jurisich | |
| 6,645,365 | B2 | 11/2003 | Fairbourn et al. | |
| 6,754,954 | B1 | 6/2004 | Decker | |
| 6,793,838 | B2 | 9/2004 | Hansen et al. | |
| 6,991,425 | B2 | 1/2006 | Kruegel et al. | |
| 7,871,242 | B2 * | 1/2011 | Swanson et al. | 415/145 |
| 7,976,754 | B2 * | 7/2011 | Tardy et al. | 264/209.3 |
| 8,596,972 | B2 * | 12/2013 | Moon | 415/213.1 |
| 2005/0058542 | A1 | 3/2005 | Kruegel et al. | |
| 2006/0277754 | A1 * | 12/2006 | Rockstroh et al. | 29/889.721 |
| 2009/0053043 | A1 * | 2/2009 | Moon | 415/144 |
| 2009/0097965 | A1 * | 4/2009 | Swanson et al. | 415/127 |
| 2011/0293828 | A1 * | 12/2011 | Eberling-Fux et al. | 427/249.2 |
| 2012/0112394 | A1 * | 5/2012 | Burt et al. | 267/136 |

OTHER PUBLICATIONS

"Alternate Material Choices—some challenges to the increased use of Ti alloys", J.C. Williams, Materials Science and Engineering, 1999.*
"Gas and Liquid Flow in Parallel Micro-Channels", Kalaivanan et al, Journal of Applied Sciences Research, 2010.*

* cited by examiner

*Primary Examiner* — Michael D Masinick
(74) *Attorney, Agent, or Firm* — O'Shea Getz P.C.

(57) ABSTRACT

A method for manufacturing an apparatus with a flow passage includes providing a preform apparatus with a preform flow passage. Flow area of the preform flow passage is determined to provide determined flow area data. The determined flow area data is compared to reference flow area data to provide flow area comparison data. The preform apparatus is chemical milled based on the flow area comparison data.

20 Claims, 3 Drawing Sheets

METHOD FOR CHEMICAL MILLING AN APPARATUS WITH A FLOW PASSAGE

This invention was made with government support under Contract No. N00019-02-C-3003 awarded by the United States Navy. The government may have certain rights in the invention.

BACKGROUND OF THE INVENTION

1. Technical Field

The present invention relates to chemical milling and, in particular, to a method for chemical milling an apparatus with a flow passage based on flow area of the flow passage.

2. Background Information

Apparatus with flow passages may be utilized for various applications such as, for example, components for gas turbine engines. Gas turbine engine components may be manufactured using both casting and machining processes. A gas turbine engine duct blocker, for example, may be cast and subsequently machined to provide the duct blocker with a predetermined geometry. A typical machining process, however, may be time consuming, relatively expensive and leave the duct blocker with discontinuous surfaces.

SUMMARY OF THE DISCLOSURE

According to a first aspect of the invention, a method for manufacturing an apparatus with a flow passage includes providing a preform apparatus with a preform flow passage. Flow area of the preform flow passage is determined to provide determined flow area data. The determined flow area data is compared to reference flow area data to provide flow area comparison data. The preform apparatus is chemical milled based on the flow area comparison data.

According to a second aspect of the invention, a method for manufacturing a gas turbine engine component with a flow passage includes forming a preform engine component with a preform flow passage. Flow area of the preform flow passage is determined, and compared to reference flow area. A chemical milling time is determined based on the comparison between the determined flow area and the reference flow area, and the preform engine component is chemical milled for the chemical milling time.

The foregoing features and the operation of the invention will become more apparent in light of the following description and the accompanying drawings.

DETAILED DESCRIPTION OF THE INVENTION

The present invention includes a method for manufacturing an apparatus that includes a flow passage with a predetermined flow area. The method includes providing a preform apparatus that includes a preform flow passage. The preform apparatus and the preform flow passage may respectively have substantially the same geometrical configuration as the apparatus and the flow passage, however, for example, with one or more different dimensions. Flow area of the preform flow passage therefore is determined, and compared to a reference flow area that is indicative of the predetermined flow area. Based on this comparison, the preform apparatus is chemical milled to provide a milled apparatus that includes a milled flow passage with a milled flow area that is substantially equal to the reference flow area and, thus, the predetermined flow area.

Figure 1:
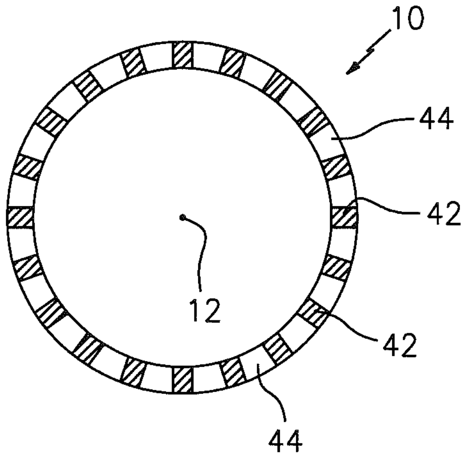
FIG. 1 is a front view illustration of a rotational duct blocker for a gas turbine engine.
Figure 2:
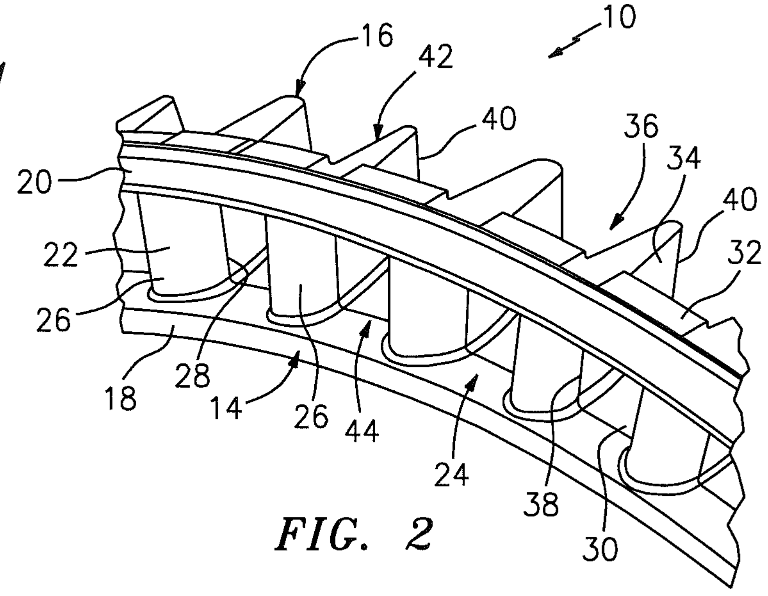
FIG. 2 is a partial perspective illustration of a rotational duct blocker in a first configuration.
Figure 3:
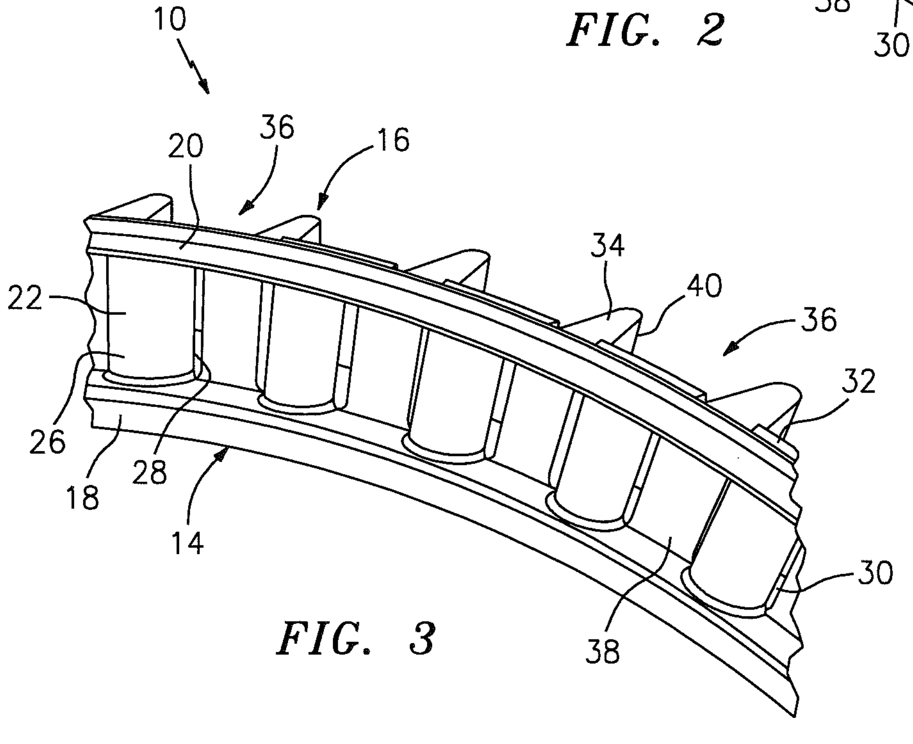
FIG. 3 is a partial perspective illustration of a rotational duct blocker in a second configuration.

Apparatuses with flow passages may be utilized for various applications such as, for example, components for gas turbine engines. FIG. 1 is a front view illustration of a rotational duct blocker 10 for a gas turbine engine that extends circumferentially around an axial centerline 12. FIG. 2 is a partial perspective illustration of the duct blocker 10 in a first configuration (e.g., an open configuration). FIG. 3 is a partial perspective illustration of the duct blocker 10 in a second configuration (e.g., a closed configuration). Referring to FIGS. 2 and 3, the duct blocker 10 includes an annular duct blocker rotor 14 and an annular duct blocker stator 16.

The duct blocker rotor 14 includes an inner rotor platform 18, an outer rotor platform 20, a plurality of first vane segments 22 (e.g., leading edge vane segments), and a plurality of first flow apertures 24. The first vane segments 22 extend radially from the inner rotor platform 18 to the outer rotor platform 20. Each first vane segment 22 extends axially from a first vane edge 26 (e.g., a vane leading edge) to a first vane endwall 28. Each first flow aperture 24 extends circumferentially between respective adjacent first vane segments 22, and axially through the duct blocker rotor 14.

The duct blocker stator 16 includes an inner stator platform 30, an outer stator platform 32, a plurality of second vane segments 34 (e.g., trailing edge vane segments), and a plurality of second flow apertures 36. The second vane segments 34 extend radially between the inner stator platform 30 and the outer stator platform 32. Each second vane segment 34 extends axially from a second vane endwall 38 to a second vane edge 40 (e.g., a vane trailing edge). Each second flow aperture 36 extends circumferentially between respective adjacent second vane segments 34, and axially through the duct blocker stator 16.

The inner rotor platform 18 is arranged axially adjacent to the inner stator platform 30. The outer rotor platform 20 is arranged axially adjacent to the outer stator platform 32.

During engine operation, the duct blocker rotor 14 rotates relative to the duct blocker stator 16. More particularly, the first vane segments 22 move circumferentially relative to the second vane segments 34 to regulate how much fluid may flow from the first flow apertures 24 to the second flow apertures 36. The first vane segments 22 may move, for example, between the first configuration (e.g., the open configuration) illustrated in FIG. 2 and the second configuration (e.g., the closed configuration) illustrated in FIG. 3.

In the first configuration (e.g., the open configuration) illustrated in FIG. 2, the first vane segments 22 and the second vane segments 34 are respectively circumferentially aligned and form a plurality of duct blocker vanes 42. Each duct blocker vane 42 may have an airfoil cross-sectional geometry that extends axially from the first vane edge 26 to the second vane edge 40. The first flow apertures 24 and the second flow apertures 36 are also respectively circumferentially aligned and form a plurality of sub-flow passages 44 that extend axially through the duct blocker 10. The sub-flow passages 44 collectively form a flow passage that has a first flow area in the first (e.g., open) configuration.

In the second configuration (e.g., the closed configuration) illustrated in FIG. 3, the first vane segments 22 are respectively circumferentially aligned with the second flow apertures 36. The first vane segments 22 therefore substantially restrict fluid flow through the flow passage to a second flow area in the second (e.g., closed) configuration that is substantially less than the first flow area.

Figure 4:
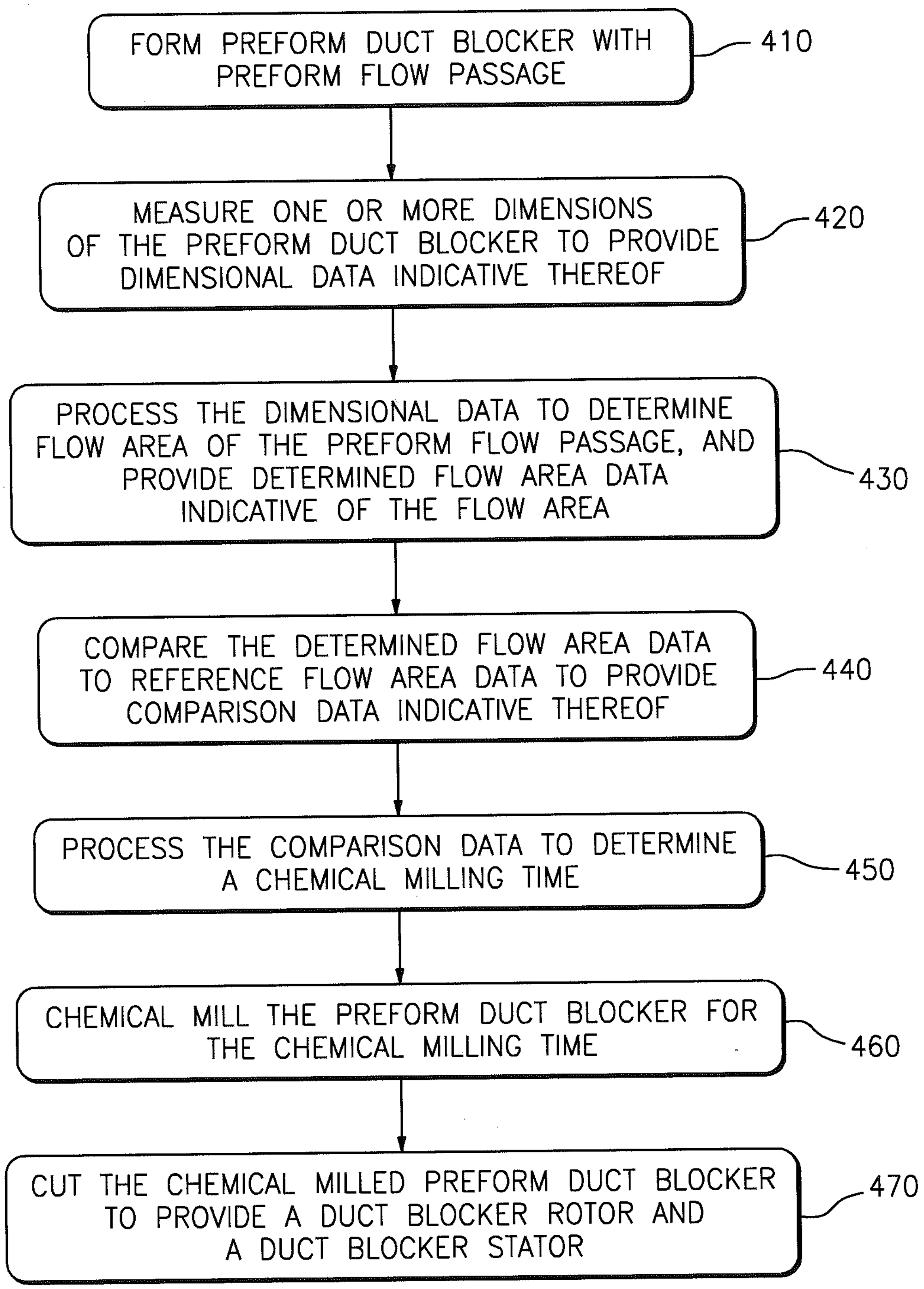
FIG. 4 is a flow diagram of a method for manufacturing a rotational duct blocker.
Figure 5:
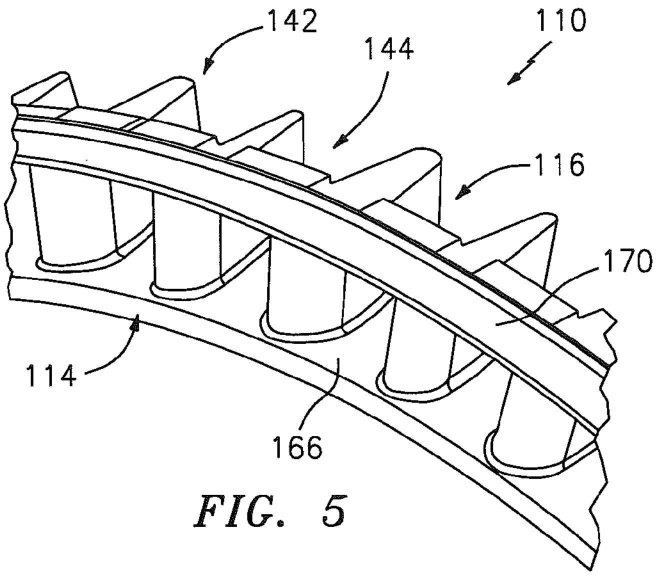
FIG. 5 is a partial perspective illustration of a preform duct blocker.

FIG. 4 is a flow diagram of a method for manufacturing the duct blocker illustrated in FIGS. 1-3. In step 410, a preform duct blocker 110 is cast, for example, as a unitary body. FIG. 5 is a partial perspective illustration of the preform duct blocker 110, which includes a plurality of preform vanes 142 and a plurality of preform sub-flow passages 144. The preform vanes 142 and the preform sub-flow passages 144 may have substantially the same geometrical configuration as the vanes 42 and the sub-flow passages 44 illustrated in FIG. 2. The preform vanes 142 and the preform sub-flow passages 144, however, may have one or more different dimensions than the vanes 42 and the sub-flow passages 44 illustrated in FIG. 2. Examples of methods for casting the preform duct blocker 110 may include investment casting (e.g., lost wax casting), sand casting, shell casting, die casting, etc. The preform duct blocker 110 may also be formed using methods such as forging, machining, etc.

Figure 6:
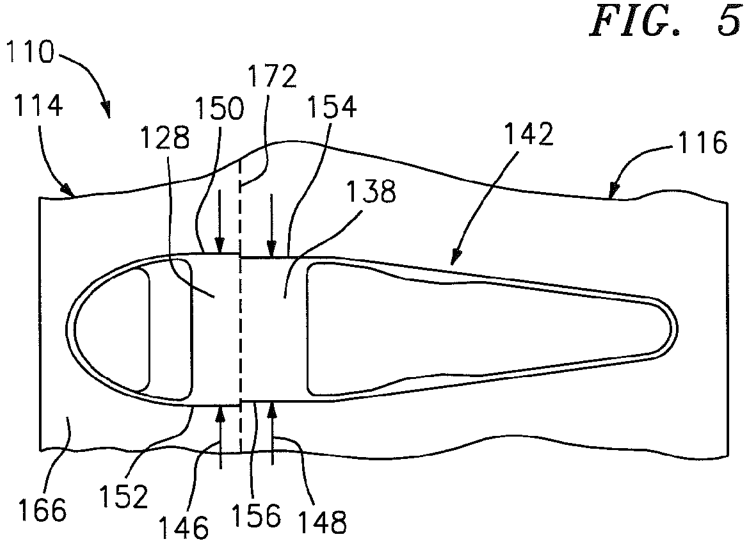
FIG. 6 is a partial sectional illustration of a vane included in the preform duct blocker illustrated in FIG. 5.
Figure 7:
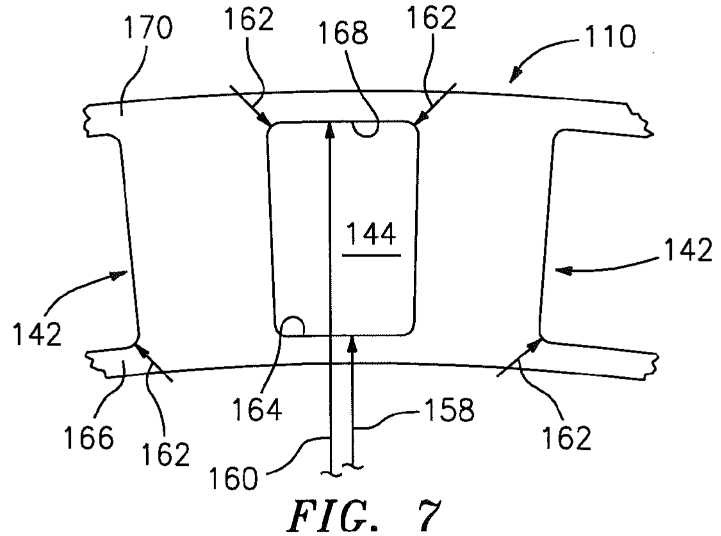
FIG. 7 is a partial cross-sectional illustration of the preform duct blocker illustrated in FIG. 5.

In step 420, one or more dimensions of the preform duct blocker 110 are measured. Referring to FIG. 6, for example, a first preform vane segment width 146 and a second preform vane segment width 148 may be measured for one or more of the preform vanes 142. The first preform vane segment width 146 extends circumferentially between a first side 150 and a second side 152 of a first preform vane endwall 128. The second preform vane segment width 148 extends circumferentially between a first side 154 and a second side 156 of a second preform vane segment endwall 138. Referring now to FIG. 7, an inner duct radius 158, an outer duct radius 160 and one or more fillet radiuses 162 may also be measured for one or more of the preform sub-flow passages 144. The inner duct radius 158 extends radially from an axial centerline of the preform duct blocker 110 to an outer radial surface 164 of a preform inner platform 166. The outer duct radius 160 extends radially from the axial centerline to an inner radial surface 168 of a preform outer platform 170. The aforesaid dimensions may be measured with, for example, a coordinate measuring machine, and provided to a processor as dimensional data. The dimensions may also be measured using other automated dimensional metrology machines (e.g., optical or laser non-contact measurement devices, etc.), or manually with, for example, a micrometer or caliper.

In step 430, the dimensional data is processed to determine flow area of the preform flow passage for a configuration where, for example, the preform duct blocker 110 is arranged in a second configuration (e.g., a closed configuration). The flow area may be determined, for example, by calculating an average flow area of the preform sub-flow passages 144, and multiplying the average flow area by the total number (N) of preform sub-flow passages 144 included in the preform duct blocker 110.

$$\text{Total Flow Area} = N \times \text{Avg. Flow Area} \qquad \text{(Eq. 1)}$$

The average flow area may be calculated with, for example, the following expressions:

$$\begin{aligned} Avg.\ \text{Flow Area} = &\ (Avg.\ \text{Passage Height}) \times (Avg.\ \text{Passage Width}) - \\ &\ 4 \times (Avg.\ \text{Fillet Area}); \text{ and} \end{aligned} \qquad \text{(Eq. 2)}$$

$$Avg.\ \text{Fillet Area} = 0.215 \times (Avg.\ \text{Fillet Radius})\text{^}2. \qquad \text{(Eq. 3)}$$

The Avg. Passage Height may be calculated by subtracting an average value ($R_1$) of the inner duct radiuses 158 from an average value ($R_2$) of the outer duct radiuses 160. The Avg. Passage Width may be calculated for the second (e.g., closed) configuration, for example, with the following expression:

$$\text{Avg. Passage Width} = [\pi \times (R_1 + R_2) - W_1 - W_2] \div N \qquad \text{(Eq. 4)}$$

where $W_1$ is an average value of the first preform vane segment widths 146, and $W_2$ is an average value of the second preform vane segment widths 148. The Avg. Fillet Radius is the average value of the fillet radiuses 162.

In step 440, determined flow area data is compared to (e.g., subtracted from) reference flow area data to provide flow area comparison data. The determined flow area data is indicative of the flow area of the preform flow passage determined in step 430. The reference flow area data is indicative of the second flow area of the flow passage illustrated in FIG. 3, which may be provided by a part specification or standard.

In step 450, the flow area comparison data is processed to determine a chemical milling time. The chemical milling time is indicative of a quantity of time that the preform duct blocker 110 may be subjected to a chemical milling solution to increase its flow area, for example, to the second flow area set forth by the reference flow area data.

In step 460, the preform duct blocker 110 is chemical milled and, more particularly, subjected to (e.g., submersed in) a chemical milling solution for at least a portion of the chemical milling time. The chemical milling solution substantially uniformly removes material from exposed surfaces of the preform duct blocker 110, and may increase the flow area of the preform flow passage to the second flow area set forth by the reference flow area data. The chemical milling may also provide the preform duct blocker 110 with relatively smooth and continuous surfaces, and may remove alpha case where, for example, the preform duct blocker is constructed from titanium or titanium alloy.

Referring to FIGS. 4 and 6, in step 470, the milled preform duct blocker 110 is cut along a circumferential cut line 172 to provide a duct blocker rotor 114 and a duct blocker stator 116, which may have substantially the same geometry and dimensions as the duct blocker rotor 14 and the duct blocker stator 16 illustrated in FIGS. 2 and 3.

In some embodiments, steps 420, 430, 440, 450 and 460 may be repeated one or more times on the milled preform duct blocker before step 470, for example, to ensure the flow area of the milled flow passage is substantially equal to the second flow area set forth by the reference flow area data.

In some embodiments, one or more portions of the preform duct blocker may be masked before step 460.

In some embodiments, one or more post chemical milling processes may be performed on the milled preform duct blocker 110. Examples of post chemical milling processes may include machining, additional chemical milling processes, etc.

In some embodiments, the Avg. Fillet Area may alternatively be calculated by multiplying the Avg. Fillet Radius by a predetermined correction factor.

One of ordinary skill in the art will appreciate that the steps of the disclosed method may be performed automatically, for example, under the control of a processing device that executes program instructions. However, it is also contemplated that the steps may be performed by discrete devices.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A method for manufacturing an apparatus comprising a flow passage, comprising:

providing a preform apparatus comprising a preform flow passage;

determining flow area of the preform flow passage to provide determined flow area data;

comparing the determined flow area data to reference flow area data to provide flow area comparison data; and chemical milling the preform apparatus based on the flow area comparison data.

2. The method of claim 1, further comprising casting the perform apparatus.

3. The method of claim 1, further comprising determining a chemical milling time based on the flow area comparison data, wherein the chemical milling of the preform apparatus comprises applying a chemical milling solution to the preform apparatus for the chemical milling time.

4. The method of claim 1, further comprising measuring dimensions of the preform apparatus with a coordinate measuring machine to provide dimensional data, wherein the flow area of the preform flow passage is determined by processing the dimensional data.

5. The method of claim 1, wherein the preform flow passage comprises a plurality of preform sub-flow passages.

6. The method of claim 5, wherein the preform apparatus further comprises a plurality of preform vanes, and wherein a first of the plurality of the preform sub-flow passages extends between respective adjacent preform vanes.

7. The method of claim 6, further comprising measuring dimensions of the preform vanes to provide dimensional data, wherein the flow area of the preform flow passage is determined by processing the dimensional data.

8. The method of claim 6, further comprising measuring dimensions of the preform sub-flow passages to provide dimensional data, wherein the flow area of the preform flow passage is determined by processing the dimensional data.

9. The method of claim 6, wherein the apparatus further comprises a duct blocker rotor that rotates relative to a duct blocker stator between a first configuration and a second configuration, wherein the flow passage comprises a first flow area in the first configuration, and wherein the flow passage comprises a second flow area in the second configuration that is less than the first flow area.

10. The method of claim 9, wherein the flow area of the preform flow passage is determined for when the duct blocker rotor and the duct blocker stator are in the second configuration.

11. The method of claim 10, further comprising measuring dimensions of the preform sub-flow passages and the preform vanes, and averaging the respective dimensions to provide dimensional data, wherein the flow area of the preform flow passage is determined by processing the dimensional data.

12. The method of claim 9, further comprising cutting the milled preform apparatus to provide the duct blocker rotor and the duct blocker stator.

13. The method of claim 1, wherein the apparatus comprises a gas turbine engine component.

14. The method of claim 1, further comprising:

determining flow area of the milled preform flow passage to provide second determined flow area data;

comparing the second determined flow area data to the reference flow area data to provide second flow area comparison data; and chemical milling the milled preform apparatus based on the second flow area comparison data.

15. The method of claim 1, further comprising masking a portion of the preform apparatus.

16. A method for manufacturing a gas turbine engine component comprising a flow passage, comprising:

forming a preform engine component comprising a preform flow passage;

determining flow area of the preform flow passage;

comparing the determined flow area of the preform flow passage to reference flow area, and determining a chemical milling time based on the comparison; and chemical milling the preform engine component for the chemical milling time.

17. The method of claim 16, wherein the preform engine component is formed through casting.

18. The method of claim 16, further comprising measuring dimensions of the preform engine component to provide dimensional data, wherein the flow area of the preform flow passage is determined by processing the dimensional data.

19. The method of claim 16, further comprising measuring dimensions of the preform flow passage to provide dimensional data, wherein the flow area of the preform flow passage is determined by processing the dimensional data.

20. The method of claim 16, wherein the preform flow passage comprises a plurality of preform sub-flow passages.

* * * * *